United States Patent [19]
Morris

[11] Patent Number: 5,094,057
[45] Date of Patent: Mar. 10, 1992

[54] ANCHOR FOR SIMULATED MARBLE PANELS AND THE LIKE

[76] Inventor: Phillip L. Morris, 15 Ridgewood Dr., Hockessin, Del. 19707

[21] Appl. No.: 465,984

[22] Filed: Jan. 16, 1990

[51] Int. Cl.$^5$ .......................... E04B 1/41; E04C 2/02
[52] U.S. Cl. ...................................... 52/511; 52/506; 52/391; 411/82; 411/340
[58] Field of Search ............... 248/205.3; 52/391, 366, 52/506, 511, 512, 743, 746, 744, 827; 411/82, 171, 257-258, 392, 340, 343, 345-346; 524/785; 428/36.5, 119, 287

[56] References Cited

U.S. PATENT DOCUMENTS

| | | | |
|---|---|---|---|
| 865,610 | 9/1907 | Pullets | 411/340 |
| 3,523,395 | 8/1970 | Rutter et al. | 52/410 |
| 4,270,325 | 6/1981 | Mandelli | 52/391 |
| 4,413,089 | 11/1983 | Gavin et al. | 524/785 |
| 4,446,177 | 5/1984 | Munoz et al. | 428/287 |
| 4,519,174 | 5/1985 | Witt | 52/389 |
| 4,608,291 | 8/1986 | Gove | 428/119 |
| 4,814,220 | 3/1989 | Brathwaite | 52/827 |
| 4,844,944 | 7/1989 | Graefe et al. | 428/36.5 |
| 4,850,746 | 7/1989 | Finsterwalder et al. | 411/82 |
| 4,899,513 | 2/1990 | Morris | 52/511 |
| 4,915,557 | 4/1990 | Stafford | 411/82 |
| 4,956,030 | 9/1990 | Baskin | 52/309.1 |

Primary Examiner—Richard E. Chilcot, Jr.
Assistant Examiner—Joanne C. Downs
Attorney, Agent, or Firm—Connolly & Hutz

[57] ABSTRACT

Simulated marble panels and the like are mounted in place by an anchor which includes an elongated pin having a pointed remote end with an anchor plate secured to its opposite base end. The anchor plate has a plurality of perforations extending completely through it so that it may be positioned in a recess in the panel and permanently mounted to the panel by means of a bonding agent applied to the recess which flows through the perforations in the anchor plate and covers the anchor plate when it forms an integral bond with the panel. The pin may then be secured to a substrate in any suitable manner.

12 Claims, 2 Drawing Sheets

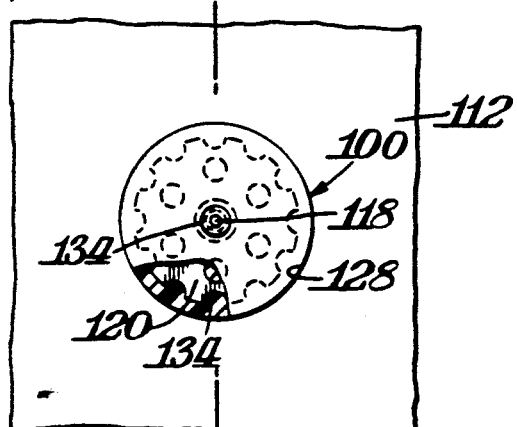
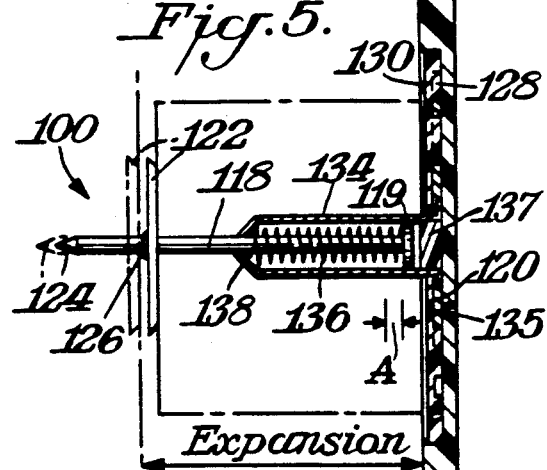
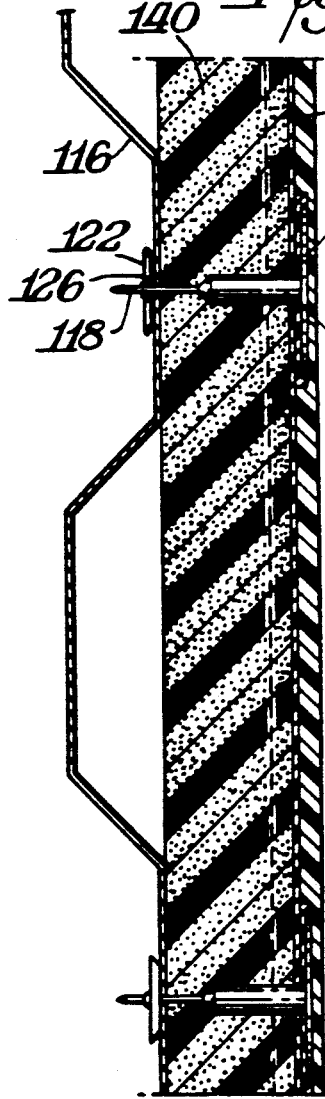
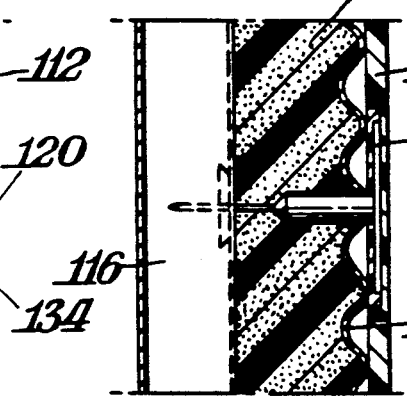
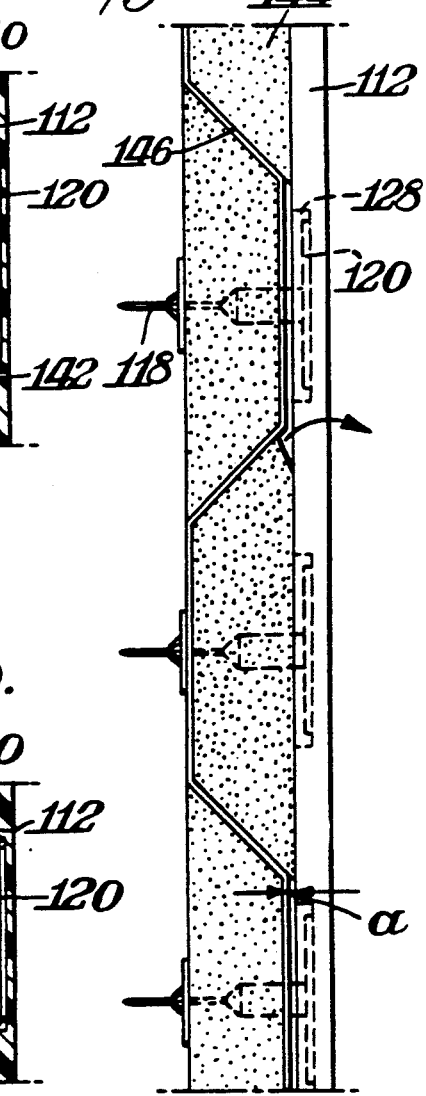
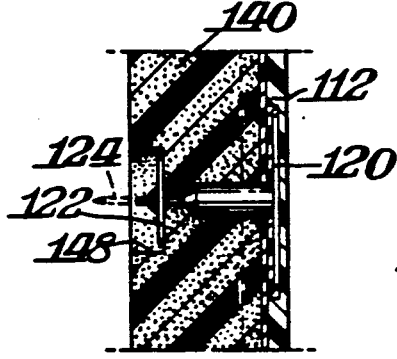

5,094,057

ANCHOR FOR SIMULATED MARBLE PANELS AND THE LIKE

CROSS-REFERENCE TO RELATED APPLICATION

This application is a continuation in part of application Ser. No. 301,393, filed Jan. 25, 1989.

BACKGROUND OF THE INVENTION

A popular panel material is simulated marble, particularly such simulated marble marketed by the DuPont Company under the trademark CORIAN ®. While this simulated marble material is highly attractive, because of the nature of the material it is difficult to mount panels of the material to walls and other support surfaces without using some attaching means that detract from its attractiveness particularly where the support surface is a metal structural substrate. For example, conventional practices require the use of edge molding materials to facilitate mounting the panels or require using fasteners which must extend completely through the panels but which are unsightly. Because of the mounting difficulties, the prior art had not made full use of the aesthetic nature and of the demand by consumers for such simulated marble panels. Such problem also exists for other panels such as made from resin or resin filled sheets.

U.S. Pat. No. 3,910,539 discloses an anchor device for insulation material, but not for CORIAN ® panels. U.S. Pat. Nos. 1,971,396; 2,793,887 and 3,246,439 also disclose anchor devices.

SUMMARY OF THE INVENTION

An object of this invention is to provide an anchor member which is capable of mounting simulated marble panels or the like without causing any unsightly modifications to the panels such as molding strips or holes in the panels.

A further object of this invention is to provide such an anchor member which may be securely fastened to a panel and in turn also securely fastened to a structural substrate.

In accordance with this invention, the anchor member is in the form of an elongated pin having a point at one end and a base at the other end. An anchor plate is secured to the base end of the pin. The anchor plate has a plurality of holes or perforations extending completely therethrough so that the anchor plate may be inserted into a recess in a simulated marble panel. The recess may then be filled with a bonding agent which flows into the holes in the anchor plate and also covers the anchor plate to permanently mount the anchor plate and the pin to the panel when the bonding agent becomes integrally joined to the panel. The anchor plate thereby becomes embedded in the panel. The exposed portion of the pin may then be utilized to mount the panel to a fixed support, such as a metal structural substrate.

In a preferred practice of this invention a lock or retainer plate is slidably mounted in a one-way direction on the pin for pressing against the substrate from behind which would be sandwiched between the retainer plate and the embedded anchor plate.

In an alternative embodiment the anchor includes a spring mounted pin.

THE DRAWINGS

FIG. 4 is a front elevation view, partly in section, of a modified anchor member mounted to a panel in accordance with this invention;

FIG. 5 is a cross-sectional view taken through FIG. 4 along the line 5—5; and

FIGS. 6-9 are cross-sectional views of the anchor member of FIGS. 4-5 mounted to different structures.

DETAILED DESCRIPTION

The present invention is specifically intended to provide an anchor member which may be used for mounting a resin or resin-filled sheet such as a simulated marble article or the like, particularly one of a type marketed by the DuPont Company under the trademark CORIAN ®. Such a simulated marble article is disclosed in greater detail in U.S. Pat. No. 3,847,865 which relates to the composition of the simulated marble article, namely, alumina trihydrate in a polymethyl methacrylate. The details of that patent are incorporated herein by reference thereto. Such a panel is high attractive, but because of the nature of its composition, it is difficult to mount panels of such material to metal structural substrates without requiring the use of molding or fasteners which extend completely through the panel and thus are unsightly and detract from its appearance. Additionally such panels are translucent and ideal fasteners should not invade the translucency of the sold color product. The solid color preservation is a particular problem where thin panels of, for example, ¼ inch thickness are used as is customary in the art. Other suitable resins include acrylics such as the commercial product AVRON.

The present invention relates to a mechanical system for fastening simulated marble panels such as CORIAN ® sheeting to metal or other structural substrates. The invention is particularly useful and fills a distinct need in that there are no acceptable adhesives presently on the market to effect a permanent bonding of material such as CORIAN ® to metal. The invention, however, insures the successful application of such sheeting to substrates for interior or exterior vertical or inverted horizontal uses. Thus, the invention makes possible, the panelization of simulated marble sheeting such as CORIAN ® for the building industry.

Figure 3:
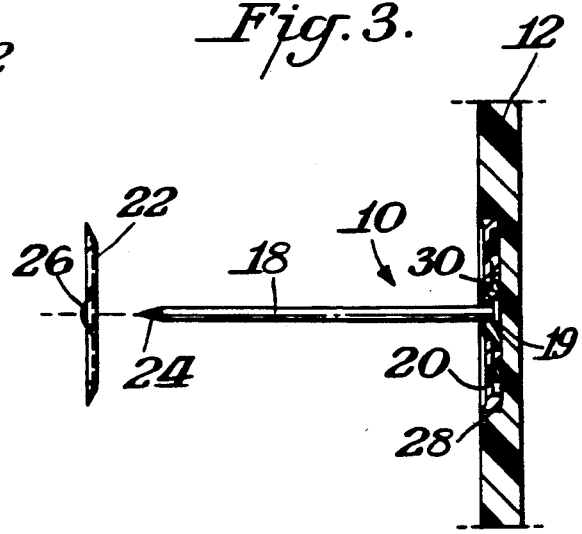
FIG. 3 is a cross-sectional view taken through FIG. 2 along the line 3—3.

The mechanical system of this invention involves embedding a modified insulation hanger or anchor 10 into a shallow pocket or recess 28 such as illustrated in FIG. 3. Pocket or recess 28 would be, for example, milled into the back side of the simulated marble sheeting 12 and filled with any suitable bonding agent such as DuPont CORIAN ® joint compound. Anchor or hanger 10 is in the form of a pin or shaft 18 having a head or flange 19 at one end thereof to which is secured a perforated base or plate 20. When the hanger or anchor 10 is inserted in recess 28 with plate 20 exposed below the outer surface of the panel 12 the perforated base or plate 20 becomes inundated with the joint bonding agent 30 which flows into recess 20 to fill all of the perforations in plate 20 and fill the remainder of recess 28 while covering plate 20. The excess bonding agent may be troweled away to provide a flush fashion. Alternatively, the adhesive surface may be slightly below the panel surface.

A feature of the invention is a different approach in the type of bonding agent. The bonding agent is a methyl methacrylate monomer added to the CORIAN ® surface and polymerized. As a result a surface interaction occurs whereby the adjoining surface of the CORIAN ® is dissolved while the methyl methacrylate monomer is being catalyzed and polymerized. The result is a monolithic or integral bond of the bonding agent and CORIAN ® panel. This bonding is quite different from a standard adhesive type system where one type of compound forms a surface adhesion to another type of compound. With the invention the result is theoretically uniform and should achieve theoretically the same strength as the virgin material. Thus in the anchoring of mechanical fasteners 10 to a CORIAN ® substrate it is important to realize that the metal base 20 of the anchorage 10 is not adhesively fastened to the CORIAN®, rather it is encased in an embedment of monolithic structure. This is accomplished by using a material as the bonding agent which is essentially the same as the CORIAN ® so that an integral bond results. The anchor 10 is embedded even where shallow recesses are used. The cured joint of the bonding agent to the panel thereby yields a theoretically, chemically monolithic embedment for the base 20 of anchor or hanger 10 with tremendous tensile resistance. The result is a firmly embedded galvanized pin 18 projecting perpendicular to the back surface of the panel 12.

A one-way locking tab or retainer plate 22 is applied to pin 18 after the pin 18 penetrates a predrilled substrate creating a permanent fastening point for the panel 12. The predrilled substrate holes are preferably two to three pin diameters larger than the diameter of pin 18 to allow for differential expansion of the CORIAN ® and the substrate under exterior conditions. When combined with a good structural silicon adhesive such as Dow #790 or 795 a particularly effective fastening results.

The insulation hanger or anchor 10 is preferably made of a six to eight penny galvanized pin 18 pointed at one end 24 and peaned or rivet formed into a small perforated piece of galvanized sheet metal which forms base or plate 20. Plate 20 is preferably a circular metal disc. Base or plate 20 may for example be of approximately 28-30 gauge thickness. Base or plate 20 is preferably of one inch in diameter with each perforation being about 3 mm with about 1-1½ mm average tangential separation to reduce the surface area of the base 20. This reduction greatly strengthens the permeating fashion of the joint compound allowing for extremely shallow pocketing of the anchor 10 into the panel 12. It also reduces radial and transplanar rupturing of the organic matrix by the metal base 20 due to changes in thermal expansion coefficients of the CORIAN ® versus the metal base 20. This is a particularly unique feature in CORIAN ® systems which allows the application of, for example, one-fourth inch thick translucent CORIAN ® to be used without sacrificing structural integrity or visual irregularities in the installed product.

Figure 1:
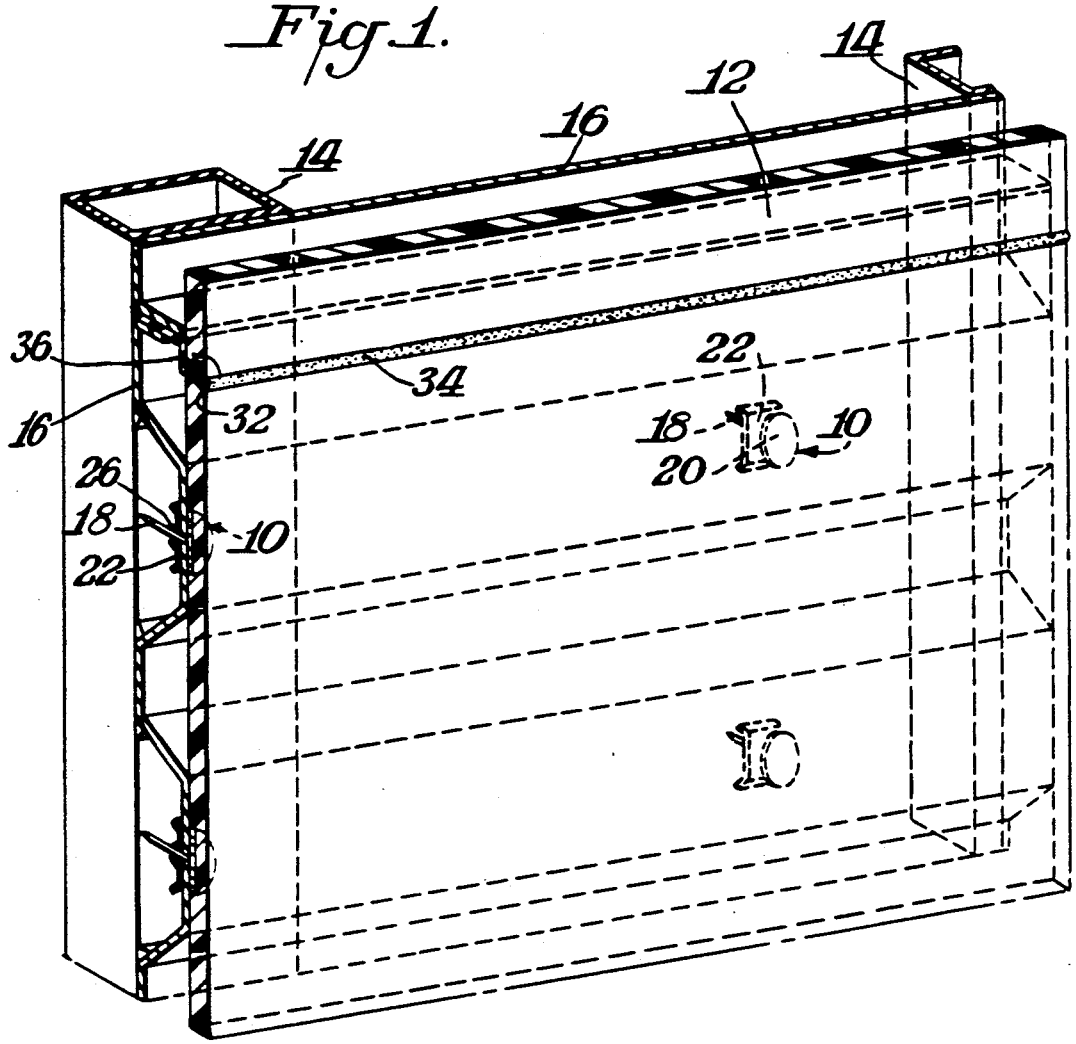
FIG. 1 is a perspective view, partly in section, of an anchor member used for mounting a simulated marble panel to a metal structural substrate.
Figure 2:
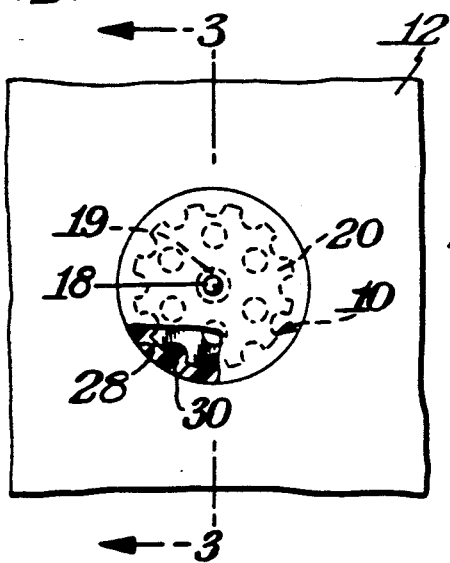
FIG. 2 is a rear elevation view, partly in section, of the anchor member of FIG. 1.

FIG. 1 illustrates one practice of the invention wherein the panel 12 is mounted to a structural substrate. In the illustrated embodiment, the structural substrate comprises spaced metal studs 14 to which is secured corrugated metal sheet backer 16 secured to studs 14 in any suitable known manner such as by welding.

The CORIAN ® panels are preferably beveled or mitred at junctions as indicated by the reference numeral 32, such as for example at a forty-five degree angle. This mitering serves to augment resistance to water penetration of the joints formed by the synthetic gasket material 34. The sealant 34 is applied on site between individually applied panels.

As previously indicated the back side or rear surface of panels 12 is formed with a plurality or pattern of recesses 28 into which is secured the base 20 of anchors 10. The pin 18 of each anchor 10 is inserted through predrilled holes in corrugated metal backer 16. Retainer plates 22 are mounted on pins 18. This is facilitated by the pointed end 24 of each pin functioning as a cam surface which slides through spring fingers 26 formed by radial slits in the retainer plates 22. As illustrated fingers 26 extend outwardly in a conical manner. The net result is to form a one-way locking tab with the corrugated backer 16 thus being sandwiched between the retainer plate 22 and the panel 12. If desired, a permanent securement of retainer plate 22 may be made in any suitable manner such as by spot welding the retainer plate 22 to pin 18 or to backer 16. A further alternative would be to provide a threaded outer surface on pin 18 and to form retainer plate 22 as an internally threaded lock nut which could be screwed onto the threaded pin while allowing for lateral expansion. A spot welding of an exaggerated concial looking tab would preferably be used on stacking panels. The spot welding of the conical looking tabs 26 prevents shear forces of the panels on stackable wall panels while allowing for expansion movement. The shear forces or settling on non-stacking curtain wall panels is arrested with projected base tabs or channels fixed to the substrate which rest on the band of vision panels below.

Two types of retaining tabs 22 are recommended for the CORIAN ® panelization system. One is a standard relatively flat stamp concial or square tab, the other one is an exaggerated conical tab. The flat tab will prevent tensile movement of the CORIAN ® panels. In all cases tensile movement is the force that should be resisted. In the case of curtain wall panelization whereby the CORIAN ® seats on incorporated tabs or channels to arrest the effects of gravity, the main concern is shear stress and the flat standard tabs will suitably arrest tensile stress on the CORIAN ®. In the case where the panels are stackable an exaggerated conical locking tab (i.e. one in which fingers 26 project outwardly a substantial distance) which will allow for more torsion in the anchorage pins. The exaggerated conical tabs are spot welded to the back of the corrugated substrates to allow for expansion movement, but not allow for an overabundance of shear movement of the CORIAN ®.

Although plate 22 is preferably circular, the invention may be practiced with square or rectangular discs.

As can be appreciated the present invention thereby provides an effective manner of mounting simulated marble panels such as CORIAN ® sheeting to a structural substrate without requiring unsightly molding or fastening devices which extend completely through the panels and without upsetting the solid color of the translucent panels.

FIG. 4–5 illustrate a modified form of anchor member 100 in accordance with this invention. As illustrated therein, anchor member 100 is generally of the same construction as anchor member 10 except that it permits movement of the pin or shaft 118 by the provision of a spring 136. Thus, anchor member 100 also includes a perforated base or plate 120. Except in the version of FIGS. 4-5, a tubular housing 134 is mounted to plate 120 with pin or shaft 118 being slidably positioned therein. Housing 134 includes a tapered outer end 138 which acts as a stop member for one end of spring 136 with the other end of spring 136 reacting against head or flange 119 of pin 118. Spring 136 is fixedly mounted to pin 118 so as to urge the pin inwardly of tubular housing 134.

As best shown in FIG. 5, anchor member 100 also includes a locking tab or retainer plate 122 having spring fingers 126 located centrally thereof for engaging on pin 118. Pin 118 terminates in a pointed end 124. In use, anchor member 100 would be mounted to panel 112 by either being located in a pre-formed recess 128 or by being surface mounted and would then be permanently secured to panel 112 by means of bonding agent 130 which forms an integral bond with panel 112 as previously described.

FIG. 5 shows in phantom the position of pin 118 and retainer plate 122 when pin 118 is fully extended by the distance A. FIG. 5 also shows in solid lines the position when pin 118 is retracted into tubular housing 134. The advantage of the spring loaded anchor member 136 thus permits the anchor member to be mounted to substrates of varying thicknesses.

FIG. 6 illustrates anchor member 100 in one form of mounting. As shown therein, a plurality of anchor members 100 are connected to panel 112 by means of the integral bond from bonding agent 130. Panel 112 is in turn secured to rigid insulation 140 and through fluted metal substrate or corrugated sheet backer 116 as illustrated.

FIG. 7 shows another form of utilizing anchor member 100 to mount a panel 112. As shown therein, a corrugated insulation member 142 is disposed between insulation board 140 and panel 112.

FIG. 8 shows yet another form of mounting the panel 112 by means of anchor member 100. As shown therein, the front loaded insulation 144 is provided with a spacing or thickness a by means of the corrugated substrate packing 146 to provide channels for the escape and venting of moisture.

FIG. 9 illustrates yet another variation for mounting panel 112 by means of anchor member 100. As shown therein, a recess 148 is formed in rigid insulation 140 for receiving the free end of anchor member 100, namely, the retainer plate 120 and the pointed end 124 of pin 118. This variation is particularly desireable in cases where the panel 112 such as acrylic sheathing is applied over a significantly thermally expandable layer such as rigid foam insulation 140 which would make the use of the expandable anchor 100 particularly desireable.

The structure of anchor 100 is particularly adapted to the broad concepts of this invention. In this regard, tubular housing 134 is secured to plate 120 by flanges 135 extending on one surface of plate 120 and the tubular portion of housing 134 then extending through an appropriate opening in plate 120. Because of the integral bond formed by bonding agent 130 with panel 120, a firm or permanent securement of tubular housing 134 to plate 120 is effectively achieved. FIG. 5, for example, illustrates material 137 formed in the interior at the base of tubular housing 134.

The invention is preferably practiced by having the anchor body extend about 75% into the foam insulation so as to not protrude from the insulation. A recess anchor such as illustrated in FIG. 9 allows the insulation 140 to be glued or mounted directly to the wall. FIG. 9, for example, illustrates the pin 118 being cut off if it extends beyond the insulation backed surface as shown in phantom.

The spring loaded anchor 100 allows for expansion and contraction of the rigid foam insulation 140 thereby maintaining a tight connection with the panel. The spring mounting will not restrict some lateral movement of the panel as shown, for example, in FIG. 6.

The rigid foam panels 140 preferably include vertical corrugated members such as illustrated in FIGS. 6-7 to allow vapor or any other water that may get between the panel 112 and the insulation 140 to be vented. This avoids the problem that trapped vapor or water between the insulation and the panel might be absorbed by the panel thereby causing the panel to warp.

FIG. 8 illustrates an alternative vent system which employs rigid foam insulation 144 recessed into corrugated substrate 146. The rigid insulation panels which may be like styrene extend beyond the face of the corrugated panels thereby providing air channels over the distance a.

It is to be understood that the invention may be practiced with panels 112 being mounted either exteriorly or interiorly of a building. Where the panels are interiorly mounted, corrugated foam insulation may not be necessary.

The invention may also be practiced by providing a connecting member made of generally the same composition as the panel material which in turn is adhered to the panel material using an adhesive again having the same general type of composition. In one aspect of this variation of the invention, the connecting member may be a tubular housing having an opening at one end wall. The anchor could be mounted in the housing with anchor plate within the housing and the pin extending through the opening and secured to the substrate. Alternatively, instead of using an anchor member as previously described, any type of stud or anchoring member can be used wherein the head is within the housing. In another variation, the connecting member could be a cast sheet having integral blocks which include keyways or other openings for receiving the anchor plate with the pin of the anchoring member mounted to the substrate. Similarly the head of a stud or other type of anchoring member could be inserted in the keyway.

What is claimed is:

1. An anchoring system for securing a panel to a structural substrate comprising an elongated pin having a remote end and having a base end opposite therefrom, an anchor plate secured to a tubular casing mounted axially and extending away from said anchor plate, said casing having an outer end with a hole through said outer end, said pin being slidably mounted in said casing with said base end disposed within said casing remote from said outer end, resilient means reacting between said outer end and said base end, said pin extending through said hole in said outer end, said anchor plate having a plurality of perforations extending therethrough whereby said anchor plate may be inserted against the rear face of the panel and secured thereto by a bonding agent completely covering the anchor plate to fill said perforations, and a retainer plate secured to said pin remote from said anchor plate whereby a portion of the substrate may be sandwiched between the panel and said anchor plate to mount the panel to the substrate.

2. The system of claim 1 wherein said remote end of said pin is pointed, and said retainer plate having spring fingers in contact with said pin and being mounted for one-way movement toward said anchor plate.

3. The system of claim 2 wherein said retainer plate is mounted to said pin as a one-way locking tab, and said spring fingers being formed by radial slits with said spring fingers extending conically toward said pointed remote end of said pin.

4. The system of claim 3 wherein said anchor plate is a circular disk.

5. The system of claim 4, in combination therewith, a panel made of a resin material and a structural substrate, a plurality of said anchoring systems securing said panel to said substrate, and said bonding agent forming an integral bond with said panel to embed said anchor plate in said panel.

6. The combination of claim 5 wherein said panel is simulated marble made from alumina trihydrate in a polymethyl methacrylate, and said bonding agent is a methyl methacrylate monomer.

7. The combination of claim 5 including at least one recess in said substrate, and said anchor plate of at least one of said anchoring systems being located in said substrate recess.

8. The combination of claim 5 wherein said panel and said substrate are vertically mounted.

9. The system of claim 1, in combination therewith, a panel made from a resin material and a structural substrate, a plurality of said anchoring systems securing said panel to said substrate, a pattern of recesses in said panel, each of said anchor plates being in a recess, said bonding agent being in said recess and covering said anchoring plate and extending not beyond the back surface of said panel, and said bonding agent forming an integral bond with said panel to embed said anchor plate in said panel.

10. The combination of claim 9 wherein said panel is simulated marble made from alumina trihydrate in a polymethyl methacrylate, and said bonding agent is a methyl methacrylate monomer.

11. The combination of claim 9 wherein said simulated marble is CORIAN ® which is translucent and about one-quarter inch thick.

12. The combination of claim 9 wherein said panel and said substrate are vertically mounted.

* * * * *